United States Patent
Kleiner

[15] 3,681,358
[45] Aug. 1, 1972

[54] HINDERED PHENOLIC ESTERS OF CYCLIC AMINO CARBOXYLIC ACIDS
[72] Inventor: Eduard Kleiner, Dobbs Ferry, N.Y.
[73] Assignee: Ciba-Geigy Corporation, Ardsley, N.Y.
[22] Filed: Dec. 9, 1968
[21] Appl. No.: 782,486

[52] U.S. Cl. .................260/268, 260/45.8, 260/239, 260/243, 260/247.2, 260/287, 260/315, 260/294.3, 260/326.1, 260/326.11, 260/326.13, 252/402

[51] Int. Cl. ............................................C07d 51/70

[58] Field of Search .................................260/268 R

[56] References Cited
OTHER PUBLICATIONS

Riddle, Reactions of Acrylic Esters, Reinhold Publishing Corp., New York, N.Y., 1954, pp. 153– 171.

Primary Examiner—Alex Mazel
Assistant Examiner—James H. Turnipseed
Attorney—Karl F. Jorda, Bruce M. Collins, Martin J. Spellman, Jr. and Nestor W. Shust

[57] ABSTRACT

Organic materials, particularly synthetic polymers such as polypropylene are protected against oxidation in air, thermal degradation or deterioration by including, in such substances, a stabilizing amount of antioxidant. The antioxidant is obtained by reacting (a) an $\alpha,\beta$-unsaturated ester of a hindered hydroquinone and (b) a heterocyclic secondary amine.

4 Claims, No Drawings

HINDERED PHENOLIC ESTERS OF CYCLIC AMINO CARBOXYLIC ACIDS

The present invention is concerned with novel compounds which are useful as antioxidants for organic materials and particularly, as antioxidants for synthetic polymers such as, for example, polypropylene, polyethylene, polystyrene, polyvinyl chloride, nylon and other polyamides, polyesters, cellulosics, polyacetals, polyurethanes, petroleum and wood resins, mineral oils, animal and vegetable fats, waxes, rubbers such as styrene-butadiene rubber (SBR), acrylonitrile-butadiene-styrene rubber (ABS), olefin-copolymers, ethylene-vinyl-acetate copolymers, polycarbonates, polyacrylonitrile, poly (4-methyl pentene-1) polymers, polyoxymethylenes, and the like. The present invention also relates to a novel procedure for preparing the aforesaid novel antioxidants and to stabilized compositions containing said novel antioxidants.

The prevention of oxidation of various organic materials is obviously of primary industrial concern and, therefore, antioxidants are used in or added to a wide variety of commercial products such as synthetic polymers of the type indicated supra, oils, plastic materials, etc., which are normally subject to oxidative deterioration.

The novel antioxidants of the present invention are represented by the following formulas:

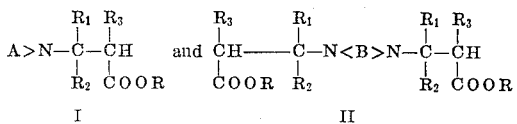

wherein R is

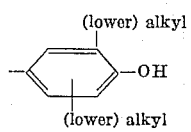

$R_1$, $R_2$ and $R_3$ are each —H, lower alkyl, phenyl, aralkyl or —$C_mH_{2m}COOR$, where $m$ is 0 to 6 and preferably 0 or 1 and aralkyl has up to 24 carbon atoms and preferably up to 12 carbon atoms, A>N— is a radical derived from a heterocyclic amine having one replaceable amine hydrogen and being selected from ethyleneimine, trimethyleneimine, pyrrolidines, piperidines, morpholines, thiomorpholines, 1,2,3,4-tetrahydroquinolines, indolines, isoindolines, carbazoles, N-alkylpiperazines, N-arylpiperazines and N-aralkylpiperazines, said alkyl, aryl and aralkyl groups having up to about 12 carbon atoms, —N < B > N— is a radical derived from a heterocyclic amine having two replaceable amine hydrogens and being selected from piperazines and 4, 4'— polymethylenedipiperidines.

The heterocyclic secondary amines may be substituted by a halogen, alkyl, aryl, aralkyl, alkoxy, hydroxyl, alkylthio or carboalkoxy group or be part of an aliphatic or aromatic ring system. From the above it should be apparent that any heterocyclic secondary amine may be employed in preparing the novel compounds of this invention. The substituents on the heterocyclic rings are of no substantial consequence as long as they do not interfere with the reaction. The presence of tertiary amines either in the ring or outside similarly do not affect the reaction.

As used herein, alkyl is meant to cover groups containing from one to 24 carbon atoms; lower alkyl covers groups containing one to six carbon atoms, alkoxy covers groups containing from one to four carbon atoms. Further, the aryl group referred to above may be substituted by a halogen (chlorine or bromine), alkyl, alkoxy, hydroxyl, alkylthio or a carboalkoxy group. Aralkyl is meant to cover a group such as benzyl which may be substituted by a halogen (chlorine or bromine), alkyl, alkoxy, hydroxyl, alkylthio or a carboalkoxy group.

The novel antioxidants of the present invention are addition products of (a) an $\alpha,\beta$-unsaturated ester of a hindered hydroquinone of the formula

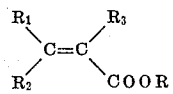

and (b) heterocyclic secondary amines of the formula A > NH and HN < B > NH, wherein R, $R_1$, $R_2$, $R_3$ and A < N— and —N< B > N— are as defined above.

The addition reaction of a heterocyclic secondary amine with an $\alpha,\beta$-unsaturated ester is accomplished by simply reacting the two reactants in equimolar quantities at room temperature in an inert solvent for from a few hours to a few days. For practical reasons, however, it is preferable to carry out the reaction at a temperature of from about 50° C to about 120° C. This reaction is more fully described in 'Reactions of the Acrylic Esters' by E.H. Riddle, p. 153–171, (Reinhold Publishing Corp., New York, N.Y., 1954).

The novel antioxidants of this invention were prepared by the following general procedure.

Equimolar amounts of the $\alpha,\beta$-unsaturated ester and the amine were dissolved in five times the amount of chloroform, sealed in an ampule under nitrogen and heated for 8 hours in an oil bath at 80° C. The reaction mixture was then filtered through five times the amount of neutral aluminum oxide and the crude reaction product was purified by crystallization as indicated in Table I. Yields are generally high, i.e., above 75 percent.

Non-heterocyclic primary and secondary amines can also be added to the $\alpha,\beta$-unsaturated esters to provide antioxidants. However, heterocyclic secondary amines are preferred because higher yields are obtained and amide formation is less favored.

Illustrative $\alpha,\beta$-unsaturated esters used in preparing the desired antioxidants of the present invention as indicated above, are represented by the following formula:

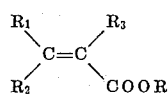

wherein R is

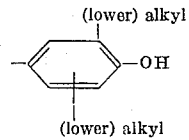

and $R_1$, $R_2$ and $R_3$ are as defined above.
Examples of such esters are:

| Esters of: | $R_1$ | $R_2$ | $R_3$ |
|---|---|---|---|
| acrylic acid | —H | —H | —H |
| methacrylic acid | —H | —H | —CH$_3$ |
| crotonic acid | —CH$_3$ | —H | —H |
| cinnamic acid | —C$_6$H$_5$ | —H | —H |
| fumaric acid | —COOR | —H | —H |
| maleic acid | —H | —COOR | —H |
| mesaconic acid | —COOR | —H | —CH$_3$ |
| citraconic acid | —H | —COOR | —CH$_3$ |
| itaconic acid | —H | —H | —CH$_2$COOR |
| aconitic acid | —COOR | —H | —CH$_2$COOR |

The preferred α,β-unsaturated esters are esters of fumaric and itaconic acid.

Some of the preferred starting α,β-unsaturated ester compounds used in preparing the antioxidant compounds of the present invention are as follows:

a. 3,5-di-tert-butyl-4-hydroxyphenyl acrylate $$CH_2=CH—COOR_0$$

b. 3,5-di-tert-butyl-4-hydroxyphenyl methacrylate $$CH_2=C(CH_3)—COOR_0$$

c. Bis(3,5-di-tert-butyl-4-hydroxyphenyl) fumarate

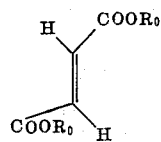

d. Bis(3,5-di-tert-butyl-4-hydroxyphenyl) itaconate $$CH_2=C—COOR_0$$
$$\phantom{CH_2=}|$$
$$\phantom{CH_2=C—}CH_2COOR_0$$

wherein $R_0$ is

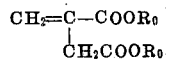

The aforesaid α,β-unsaturated esters (identified above as compounds (a), (b), (c) and (d) are reacted with the following heterocyclic secondary amines:

| Compound | Structural formula |
|---|---|
| e. piperidine |  |
| f. 1,2,3,4-tetrahydroisoquinoline | 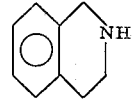 |
| g. N-benzylpiperazine | 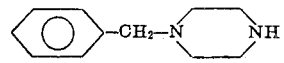 |
| h. piperazine |  |
| i. 4,4'-trimethylenedipiperidine | 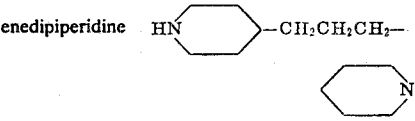 |

In the following table, Table I, the addition of the heterocyclic secondary amine to the α,β-unsaturated ester is carried out by the procedure described above. The purity of all antioxidants was checked either by TLC (thin layer chromatography) or VPC (vapor phase chromatography) and the structure was confirmed by IR (infrared) and NMR (nuclear magnetic resonance). Elemental analysis, melting and boiling points, structural formula, and the name of the product are given in Table I.

TABLE I.—PROPERTIES AND ANALYSIS OF NOVEL ANTIOXIDANTS

| Product | Appearance | Melting point (° C.) crystallized from | Elemental analysis Calcd. C | H | N | Found C | H | N | Starting material | Product |
|---|---|---|---|---|---|---|---|---|---|---|
| A | White crystals. | 85–86, heptane. | 76.24 | 8.61 | 3.42 | 76.67 | 8.73 | 3.42 | (a)+(f) | 3,5-di-tert-butyl-4-hydroxyphenyl 3-[2-(1,2,3,4-tetrahydroisoquinolyl)]propionate. 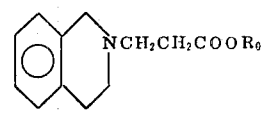 |
| B | White powder. | 66.5–69, heptane. | 72.87 | 9.09 | 2.30 | 73.11 | 9.14 | 2.34 | (c)+(e) | Bis(3,5-di-tert-butyl-4-hydroxyphenyl) piperidinosuccinate. 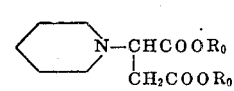 |
| C | White flakes. | 83.5–85, heptane. |  |  | 2.25 |  |  | 2.07 | (d)+(e) | Bis(3,5-di-tert-butyl-4-hydroxyphenyl) 2-(piperidonomethyl)succinate. 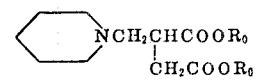 |
| D | White powder. | 177–178.5, ethyl acetate. | 71.44 | 9.15 | 4.39 | 70.93 | 8.68 | 4.20 | (a)+(h) | Bis(3,5-di-tert-butyl-4-hydroxyphenyl) 3,3'-(1,4-piperazinediyl)dipropionate. 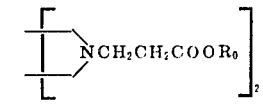 |

Table I – Continued

| Product | Appearance | Melting point (° C.) crystallized from | Elemental analysis Calcd. C | H | N | Found C | H | N | Starting material | Product |
|---|---|---|---|---|---|---|---|---|---|---|
| E | do | 105–106.5, heptane-benzene. | 75.37 | 8.55 | 2.09 | 75.88 | 8.57 | 1.99 | (d)+(f) | Bis(3,5-di-tert-butyl-4-hydroxyphenyl)2-[2-(1,2,3,4-tetrahydroisoquinolylmethyl)succinate. |
| F | do | 153–154, heptane-benzene. | 73.68 | 8.63 | 4.00 | 73.83 | 8.37 | 3.87 | (c)+(g) | Bis(3,5-di-tert-butyl-4-hydroxyphenyl) 2-[1-(4-benzyl-piperazinyl)]succinate. |
| G | do | ~46° (sinters), heptane. | 73.97 | 9.77 | 3.67 | 74.44 | 9.73 | 3.51 | (a)+(i) | Bis(3,5-di-tert-butyl-4-hydroxyphenyl)3,3'-(trimethylene-4,4'-dipiperidino)dipropionate. |
| H | do | 144–146, heptane-benzene. | 74.39 | 9.94 | 3.67 | 74.50 | 10.07 | 3.51 | (b)+(i) | Bis(3,5-di-tert-butyl-4-hydroxyphenyl)2,2'-dimethyl-3,3'-(trimethylene-4,4'-dipiperidino)dipropionate. |
| I | do | 212–213, ethyl acetate. | 72.25 | 8.84 | 2.41 | 72.37 | 8.59 | 2.41 | (d)+(h) | Tetrakis(3,5-di-tert-butyl-4-hydroxyphenyl)2,2'-(1,4-piperazinediyldimethyl)disuccinate. |
| J | do | 97.5–98, heptane. | 73.68 | 9.24 |  | 73.21 | 9.29 |  | (d)+(i) | Tetrakis(3,5-di-tert-butyl-4-hydroxyphenyl)2,2'-(trimethylene-4,4'-dipiperidinodimethyl)disuccinate. |

Additional examples of novel antioxidants represented by Formulas I and II are listed in Table II below. These antioxidants are prepared by the procedure described above. The synthesis of α,β-unsaturated esters containing hindered phenols is fully described in my copending application Ser. No. 738,770, filed on June 21, 1968 now abandoned. The amines employed in preparing the antioxidants reported in Table II are generally well known with various methods of preparation reported in the literature.

TABLE II.—NOVEL ANTIOXIDANTS

| Starting Materials | Antioxidants (product) | |
|---|---|---|
| $(CH_2)_2NH + CH_2=C(COOR_0)CH_2COOR_0$ | $(CH_2)_2NCH_2CH(COOR_0)CH_2COOR_0$ | (K) |
| $O\!\!\bigcirc\!\!NH + CH_2=C(COOR_0)CH_2COOR_0$ | $O\!\!\bigcirc\!\!NCH_2CH(COOR_0)CH_2COOR_0$ | (L) |
| $S\!\!\bigcirc\!\!NH + R_0OCOCH=CHCOOR_0$ (trans) | $S\!\!\bigcirc\!\!NCH(COOR_0)CH_2COOR_0$ | (M) |
| (indoline)NH + $R_0OCOCH=CHCOOR_0$ (trans) | (indoline)NCH(COOR_0)CH_2COOR_0 | (N) |
| (indole)NH + $CH_2=CHCOOR_0$ | (indole)NCH_2CH_2COOR_0 | (O) |
| $CH_3\text{-}\bigcirc\text{-}N\!\!\bigcirc\!\!NH + R_0OCOCH=CHCOOR_0$ | $CH_3\text{-}\bigcirc\text{-}N\!\!\bigcirc\!\!NCH(COOR_0)CH_2COOR_0$ | (P) |
| $\bigcirc\!\!NH + R_0OCOCH=CHCOOR_0$, COOC_2H_5 | $\bigcirc\!\!NCH(COOR_0)CH_2COOR_0$, COOC_2H_5 | (Q) |

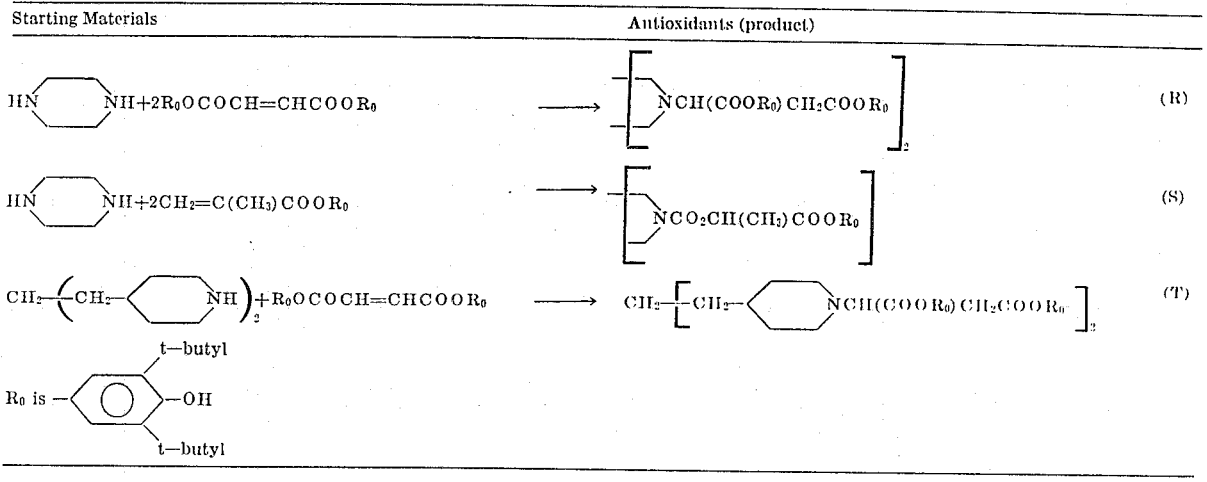

The oxidation of most polymers is so slow at ambient temperatures, even in the absence of antioxidants, that testing of the effects of antioxidants must necessarily be conducted at high temperatures in order to yield results within a convenient period of time. The tests conducted on the materials listed in Table II were conducted in a tubular oven with an airflow of 400 feet per minute at an oven temperature of 150° C. The oven ageing is set out in hours.

In preparing the sample for testing, unstabilized polypropylene powder is thoroughly blended with the indicated antioxidant. The blended material is thereafter milled on a two-roller mill at a temperature of 182° C for six minutes after which time the stabilized polypropylene is sheeted from the mill and allowed to cool. The milled polypropylene sheet which has been stabilized is then cut into small pieces and pressed for seven minutes on a hydraulic press at 218° C and 174 p.s.i. pressure. The resultant sheet of 25 mil thickness is then tested for resistance to accelerated ageing in the above described tubular oven.

TABLE III

Evaluation of novel Antioxidants in Polypropylene (25 mil), Tubular Oven, 150° C

| Product | Hours to Fail | |
|---|---|---|
| | 0.25% Antioxidant 0.5% U.V.–2 | 0.1% Antioxidant 0.5%U.V.–(2) 0.3% DSTDP.(2) |
| A | < 20 | 70 |
| B | 160 | 540 |
| C | 40 | 150 |
| D | 60 | 260 |
| E | 140 | 520 |
| F | 300 | 600 |
| I | 70 | 350 |
| J | 80 | 300 |

(1) U.V.—2: an ultraviolet absorber, 2-(3′,5′-di-t-butyl-2-hydroxyphenyl)-5-chlorobenzotriazole
(2) DSTDP: distearylthiodipropionate Results similar to those reported in Table III are obtained when the antioxidants of Table II are employed together with the indicated synergists and ultraviolet absorbers.

| Product | Secondary Antiox. | UV Absorber |
|---|---|---|
| K | DSTDP | 2-(3′-t-butyl-2′-hydroxy-5-methylphenyl)-5-chlorobenzotriazole |
| L | DLTDP | 2-hydroxy-4-n-octyloxybenzophenone |
| M | Tris-nonylphenyl-phosphite | 4-dodecyloxy-2-hydroxybenzophenone |
| N | Trilauryl trithiophosphite | 4-t-octylphenyl salicylate |
| O | DLTDP | phenylsalicylate |
| P | Tris-nonylphenyl-phosphite | 2,4-dihydroxybenzophenone |
| Q | DSTDP | 2-hydroxy-4-methoxybenzophenone |
| R | Trilauryl trithiophosphite | 5-chloro-2-hydroxybenzophenone |
| S | DLTDP | 2-(2′-hydroxy-5′-methylphenyl)benzotriazole |
| T | DSTDP | Dibenzoylresorcinol |

DLTDP = Dilaurylthiodipropionate

The tests conducted on the material listed in Table IV were conducted in a rotary oven 4 rpm, at 150° C. The oven ageing is set out in hours. The samples for this test were prepared as described above for the tubular oven tests.

TABLE IV

Evaluation of Novel Antioxidants in

Polypropylene (25 mil), Rotary Oven, 150° C.

| Product | Hours to Fail | |
|---|---|---|
| | 0.25% Antioxidant 0.5% UV–2 | 0.1% Antioxidant 0.5% UV-2 0.3% DSTDP |
| | s 50 | 370 |
| H | 70 | 350 |

Besides activity in the oven ageing test, the novel antioxidants of the present invention are characterized by excellent color values (no discoloration during the oven ageing test) and good gas fading properties.

The present antioxidants are useful in protecting synthetic polymers such as polypropylene against oxidation in air, thermal degradation or deterioration by including in such substances, a stabilizing amount of the oxidant which will vary between about 0.05 and about 5 percent and preferably, from about 0.1 to about 0.5 percent. The antioxidant can be incorporated into the synthetic polymers using conventional procedures. For example, the antioxidants of the present invention are incorporated into the material to be stabilized by any suitable means such as by milling the antioxidant on hot or cold mill rolls, by mixing it in by the use of a Banbury mixer or other well-known devices of this nature or the antioxidant may be mixed with a polyolefin material in the form of molding powder and incorporated during extrusion or prior to extrusion or during injection molding. The antioxidant may even be incorporated into a solution of the polyolefin material and the solution may then be employed for the formation of films, for wet or dry spinning of fibers, monofilament and the like.

The Examples set out above are to be considered as illustrative of the present invention and are not to be considered as restrictive. It is therefore to be understood that the invention is not limited to the specific embodiments set out above except as defined in the appended claims.

What is claimed is:

1. A compound of the formula

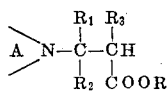

wherein R is

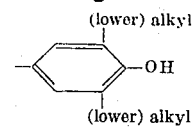

$R_1$, $R_2$ and $R_3$ are independently hydrogen, lower alkyl, phenyl or $-C_mH_{2m}COOR$ where $m$ is 0 to 6.

$A > N$ is a radical derived from N-alkylpiperazine, N-benzylpiperazine and N-tolylpiperazine, said alkyl group having up to 12 carbon atoms.

2. A compound according to claim 1 wherein R is

3. A compound according to Claim 1 wherein $R_1$ is hydrogen, one of $R_2$ and $R_3$ groups is $-C_mH_{2m}COOR$ wherein $m$ is 0 or 1, and the other is hydrogen.

4. A compound according to claim 1 wherein in Formula I A>N— is $C_6H_5CH_2$

—N⟨  ⟩N—

, $R_1$ and $R_3$ are hydrogen, $R_2$ is —COOR and R is 3,5-di-ti-butyl-4-hydroxyphenyl group.

* * * * *

UNITED STATES PATENT AND TRADEMARK OFFICE
CERTIFICATE OF CORRECTION

PATENT NO. : 3,681,358
DATED : August 1, 1972
INVENTOR(S) : Eduard Kleiner

It is certified that error appears in the above-identified patent and that said Letters Patent are hereby corrected as shown below:

Column 2, line 26, "A<N" should read -- A>N --.

Column 8, line (5), "$NCO_2CH(CH_3)COOR_O$" should read -- $NCH_2CH(CH_3)COOR_O$ --.

Column 7, line C of Table III, delete "40" and under 160 in 0.25% Antioxidant Column, insert -- 40 --.

Column 8, Table IV, above H in Product Column, insert -- G --.

Column 8, Table IV, 0.25% Antioxidant Column, "s 50" should read -- 50 --.

Signed and Sealed this

Sixth Day of September 1977

[SEAL]

Attest:

RUTH C. MASON
Attesting Officer

LUTRELLE F. PARKER
Acting Commissioner of Patents and Trademarks